United States Patent
Yamamoto et al.

(10) Patent No.: US 9,100,521 B2
(45) Date of Patent: Aug. 4, 2015

(54) IMAGE READING APPARATUS AND IMAGE FORMING APPARATUS

(71) Applicant: CANON KABUSHIKI KAISHA, Tokyo (JP)

(72) Inventors: Yuichi Yamamoto, Toride (JP); Tomofumi Sakuma, Tsukuba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/286,180

(22) Filed: May 23, 2014

(65) Prior Publication Data
US 2014/0368894 A1    Dec. 18, 2014

(30) Foreign Application Priority Data

Jun. 13, 2013   (JP) .................................. 2013-124897

(51) Int. Cl.
*H04N 1/04*   (2006.01)
*H04N 1/00*   (2006.01)
(Continued)

(52) U.S. Cl.
CPC .......... *H04N 1/00554* (2013.01); *G03G 15/605* (2013.01); *H04N 1/121* (2013.01)

(58) Field of Classification Search
CPC ..... G06F 1/1632; G06F 1/165; G06F 1/1681; G06F 1/1688; G06F 1/1643; G06F 1/1677; G06F 3/041; B65H 1/04; B65H 1/266; B65H 2801/06; B65H 2801/21; B65H 5/062; H04N 1/00525; H04N 1/00541
USPC .......... 358/400, 437, 448, 474, 475; 399/111, 399/110, 113, 116, 118, 125, 177, 218, 380, 399/78, 90
See application file for complete search history.

(56) References Cited

U.S. PATENT DOCUMENTS 5,085,422 A  *  2/1992  Sagara ........................ 271/162
5,548,379 A  *  8/1996  Fukuchi et al. ............... 399/116
(Continued)

FOREIGN PATENT DOCUMENTS

JP    03-184059 A    8/1991
JP    05-029897 B2   5/1993
(Continued)

OTHER PUBLICATIONS

Nov. 4, 2014 European Search Report in European Patent Application No. 14171797.5.

*Primary Examiner* — Negussie Worku
(74) *Attorney, Agent, or Firm* — Fitzpatrick, Cella, Harper & Scinto

(57) ABSTRACT

An image reading apparatus includes: an opening/closing portion configured to be rotatable around a hinge shaft; a biasing portion configured to apply a force to the opening/closing portion such that moment of the hinge shaft rotation higher than moment of the hinge shaft rotation according to self-weight of the opening/closing member is generated in a state in which the opening/closing portion is placed in a range up to a predetermined rotation angle from a closed position with respect to the apparatus main body, and moment of the hinge shaft rotation that is balanced with the moment of the hinge shaft rotation according to the self-weight of the opening/closing portion is generated in a state in which the opening/closing portion is opened more than the predetermined rotation angle; and a holding portion configured to maintain the opening/closing portion at the closed position.

22 Claims, 17 Drawing Sheets

(51) Int. Cl.
　　　*G03G 15/00* (2006.01)
　　　*H04N 1/12* (2006.01)

(56) References Cited

U.S. PATENT DOCUMENTS

| | | | |
|---|---|---|---|
| 5,832,356 A * | 11/1998 | Kurando et al. | 399/367 |
| 6,456,365 B1 * | 9/2002 | Hosaka et al. | 355/75 |
| 7,088,475 B1 * | 8/2006 | Terashima et al. | 358/448 |
| 8,139,994 B2 * | 3/2012 | Suzuki | 399/380 |
| 8,457,527 B2 * | 6/2013 | Takata | 399/124 |
| 2002/0166208 A1 * | 11/2002 | Kondo et al. | 16/289 |
| 2008/0226338 A1 * | 9/2008 | Ahn et al. | 399/111 |
| 2009/0034208 A1 * | 2/2009 | Suzuki | 361/725 |

FOREIGN PATENT DOCUMENTS

| | | |
|---|---|---|
| JP | H6-221050 A | 8/1994 |
| JP | 2008-60983 A | 3/2008 |

\* cited by examiner ns, and the opening/closing portion can maintain a stopped state in a whole range of opening/closing angles thereof.

IMAGE READING APPARATUS AND IMAGE FORMING APPARATUS

BACKGROUND OF THE INVENTION

1. Field of the Invention

The present invention relates to an image reading apparatus and an image forming apparatus including a hinge device that supports an opening/closing member such as an automatic document feeding device, which automatically sends an original to an image reading portion, to be opened or closed with respect to the apparatus main body of the image reading apparatus or the image forming apparatus.

2. Description of the Related Art

Conventionally, in a copying machine in which an automatic document feeding device is mounted, in a case where an original is copied, the automatic document feeding device disposed to be freely opened or closed with respect to transparent glass (hereinafter, referred to as an original base plate glass) disposed on the upper face of the apparatus main body is used in a closed state. Accordingly, the automatic document feeding device sequentially conveys originals to the original base plate glass in which an image reading portion is placed one at a time, and the originals can be automatically read one by one. In addition, instead of using the automatic document feeding device, by opening the automatic document feeding device to the apparatus main body, an original may be directly placed on the original base plate glass so as to be read.

In the automatic document feeding device, in order to automatically convey an original, many components such as various rollers and motors are built. Accordingly, the weight of the automatic document feeding device is several kilograms to several tens of kilograms, and an opening or closing operation cannot be easily performed as it is. Thus, generally, an opening/closing mechanism called a hinge device used for decreasing an operation force is included.

The hinge device has a spring built therein and applies a force in a direction opening the automatic document feeding device, in other words, a direction cancelling the weight (hereinafter, referred to as a "self-weight") of the automatic document feeding device. Accordingly, the balance between the spring and the self-weight is set such that the automatic document feeding device can be lifted with a weak force at the time of opening and can be quietly closed at the time of closing.

In addition, there is an automatic document feeding device that includes a shock absorber that is an impact mitigating portion such as an oil damper in the hinge device. Since the oil damper generates a resistance force against the direction in which the automatic document feeding device is closed, there is an advantage of decreasing the closing speed of the automatic document feeding device so as to reduce a shock or a sound generated in accordance with the collision thereof with the apparatus main body. Accordingly, not only the original base plate glass, a driving portion of the automatic document feeding device, and the like are protected, but also oscillation delivered to the image forming apparatus is reduced, whereby disturbances in an image at the time of forming the image can be prevented.

In addition, as disclosed in Japanese Patent Laid-Open No. 3-184059, in order to easily replace an original on the original base plate glass, even when the hand is separated from the open automatic document feeding device, the automatic document feeding device is set to stay at the position (hereinafter, this state will be referred to as free stop). Furthermore, in order to maintain a state in which the automatic document feeding device securely lands on the original base plate glass, balance between the spring and the self-weight is set. FIGS. 17A and 17B illustrate a conventional example. FIG. 17A is a simplified view that illustrates each opening/closing angle state, and FIG. 17B is a diagram that represents the "magnitude relation between the spring and the self-weight" at each opening/closing angle converted into moment.

For example, a state in which the ADF (automatic document feeding device) is closed with respect to the original base plate glass disposed on the reader (image reading apparatus) side is represented as 0 degrees, and a vertical state is represented as 90 degrees. At this time, in a case where the opening/closing angle is in the range of 15 degrees to 70 degrees, a state is formed in which the spring and the self-weight are balanced, and thus, when the automatic document feeding device is in the free stop state, and the hand is separated therefrom, the automatic document feeding device does not fall in accordance with the self-weight. In addition, when the automatic document feeding device is opened up to 90 degrees, a case where a handle (a knob at the time of opening or closing) is not reached by the hand at the time of closing, a case where an impact is applied to the hinge device, or the like may be caused. Thus, actually, the opening angle of the automatic document feeding device is configured to be limited up to 70 degrees.

Furthermore, in a case where the opening/closing angle is in the range of 0 degrees to 15 degrees, a state is configured to be formed in which the spring<the self-weight, so that the automatic document feeding device falls in accordance with the self-weight. Accordingly, the automatic document feeding device is configured not to be stopped in the state in which the automatic document feeding device is about half open with respect to the original base plate glass. By configuring the spring force of the hinge device to be sufficiently weaker than the self-weight of the automatic document feeding device, the automatic document feeding device securely lands on the original base plate glass.

When the automatic document feeding device does not securely land on the original base plate glass but is in a half-open state, the pressing force for the original placed on the original base plate glass is lowered, and accordingly, a defective image is generated, or a paper jam occurs when the automatic document feeding device is used. Accordingly, generally, the self-weight is set to be stronger than the spring force by about 2 to 3 Kgf as a whole at the position of the handle of the automatic document feeding device, and the state in which the automatic document feeding device is approximately half-open is avoided.

However, in the configuration disclosed in Japanese Patent Laid-Open No. 3-184059 or illustrated in FIGS. 17A and 17B, the state of closing the original base plate glass is assured by setting the self-weight of the automatic document feeding device to be larger than the spring force, and accordingly, a force of about 2 to 3 Kgf is necessary for opening the automatic document feeding device. Thus, there is a limit on the decrease in the opening/closing force.

SUMMARY OF THE INVENTION

It is desirable to improve the user's operability.

According to the present invention, there is provided an image reading apparatus including: an apparatus main body; an opening/closing portion configured to be rotatable with respect to the main body, around a hinge shaft; a biasing portion configured to apply a force to the opening/closing portion in an opening direction to generate a moment of the hinge shaft rotation higher than the moment of the hinge shaft rotation according to self-weight of the opening/closing portion, in a state in which the opening/closing portion is in a range up to a predetermined rotation angle from a closed position with respect to the apparatus main body, and to generate a moment of the hinge shaft rotation that is substantially balanced with the moment of the hinge shaft rotation according to the self-weight of the opening/closing portion, in a state in which the opening/closing portion is opened more than the predetermined rotation angle; and a holding portion configured to maintain the opening/closing portion at the closed position.

Further features of the present invention will become apparent from the following description of illustrative embodiments with reference to the attached drawings.

DESCRIPTION OF THE EMBODIMENTS

Hereinafter, illustrative embodiments of the present invention will be described in detail with reference to the drawings. However, the dimension, the material, and the shape of each constituent component described in the following embodiments and relative arrangements and the like thereof should be appropriately changed in accordance with the configuration and various conditions of an apparatus to which the present invention is applied. Accordingly, unless otherwise specified, the scope of the present invention is not intended to be limited thereto.

First Embodiment

Hereinafter, an image forming apparatus including a hinge device according to a first embodiment will be described with reference to FIGS. 1 to 10B. Here, as the image forming apparatus including the hinge device, a copying machine as an image forming apparatus including an automatic document feeding device configured to be opened or closed is illustrated as an example.

Figure 1:
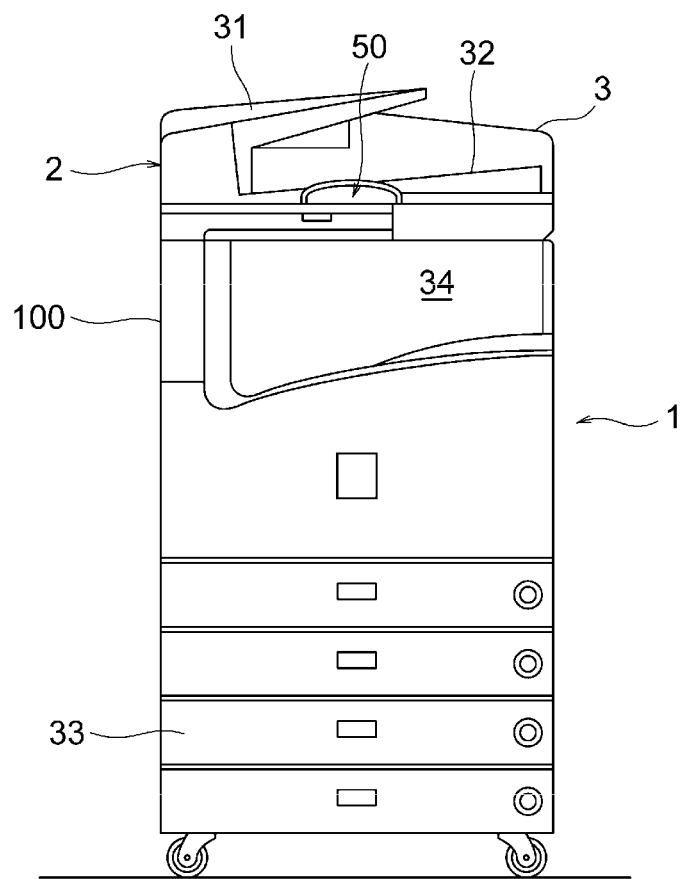
FIG. 1 is an external view of an image forming apparatus.

FIG. 1 is a schematic configuration diagram of the image forming apparatus including the automatic document feeding device configured to be opened or closed.

An image forming apparatus 1 (hereinafter, referred to as an apparatus main body) illustrated in FIG. 1 is configured by: a main body 100 thereof; a sheet cassette 33 that is mounted below the main body 100; and an automatic document feeding device (opening/closing member) 2 that is mounted on the upper face of the main body 100.

In the main body 100, an image forming portion is arranged at an approximately center portion thereof, and a feed portion is located on the lower side thereof. In addition, an image reading portion including a CCD or the like is arranged in the uppermost portion of the main body. In addition, a space is arranged between the image reading portion and the image forming portion so as to form a discharge space portion 34.

In the main body 100, the image forming portion forms an image on a sheet. The image forming portion is configured as a print engine employing a conventionally known electrophotographic system and has a laser writing portion, an electrophotographic process portion, a fixing portion, and the like, which are not illustrated in the figure, built therein. The feed portion includes the sheet cassette 33 and supplies a sheet to the image forming portion.

Figure 2:
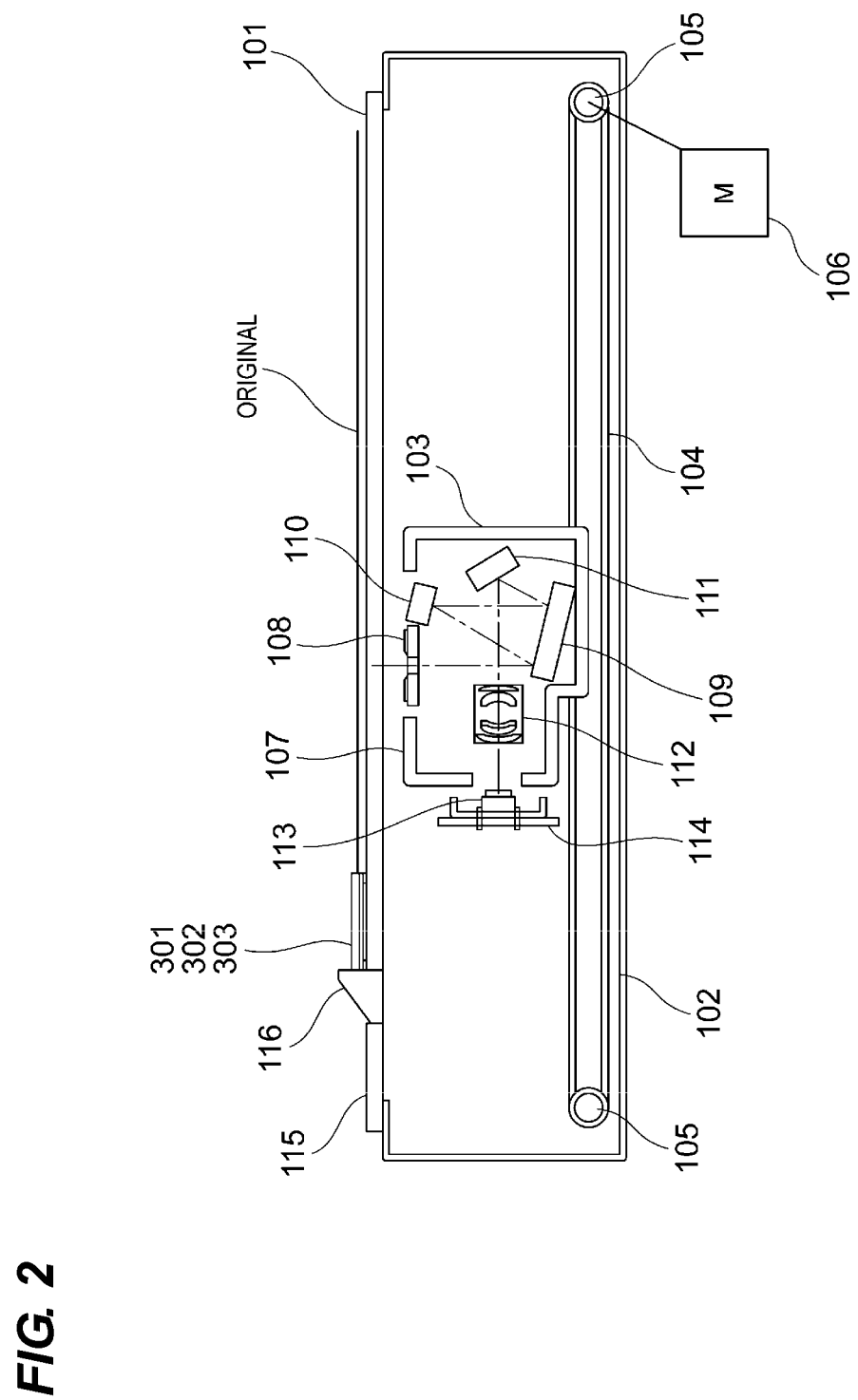
FIG. 2 is a schematic cross-sectional view of an image reading apparatus.

The image reading portion reads image information of an original. In the image reading portion, as illustrated in FIG. 2, a casing frame 102 is arranged, and, on the upper face thereof, a transparent glass 101 (hereinafter, referred to as an original base plate glass) is arranged. In addition, on the lower side thereof, an image reading unit (scan unit) 103 is arranged.

The automatic document feeding device 2 is mounted in the casing frame 102 disposed in the upper part of the main body 100 by a hinge device (hinge mechanism) disposed on the rear side of the apparatus and is supported by the upper face of the apparatus main body to be freely rotatable so as to open or close the original base plate glass 101 disposed on the upper face of the image reading portion. In the automatic document feeding device 2, a bundle of originals (not illustrated in the figure) set on an original base plate 31 is conveyed from the upper side to the original base plate glass 101 one at a time. Then, after the originals are read and scanned by the image reading portion, the originals are sequentially discharged to an original discharge plate 32.

When a copy is made without automatic feed, or when a book, a notebook, or the like is copied, the automatic document feeding device 2 may be used as a platen.

Next, a schematic configuration of an image reading apparatus according to an embodiment of the present invention will be described with reference to FIG. 2.

As illustrated in FIG. 2, an original base plate glass 101 is an original placement portion in which an original is placed, a casing frame 102 supports the original base plate glass (101), and an image reading unit (scan unit) 103 scans the original. In addition, a belt 104 moves the image reading unit (scan unit), and a pulley 105 drives the belt, and a motor 106 rotates the pulley.

The image reading unit 103 is configured by: a lighting unit 108 that lights up an original; reflecting mirrors 109, 110, and 111 that guide light reflected on the original; a lens 112 that performs image formation of light; a CCD 113 that performs photoelectric conversion of imaged light and reads a resultant signal; and an electrical substrate 114 that drives the CCD. These components are integrally mounted on a carriage frame 107 as scan units.

In such a configuration, when image information of an original is read, the image reading unit 103 scans the original using the pulley 105 and the belt 104 by rotating the motor 106 while the original placed on the original base plate glass 101 is illuminated by the lighting unit 108. The light hitting the original diffuses from the original face, is guided to the lens 112 by the reflecting mirrors 109, 110, and 111, and is imaged by the guide lens 112. Thereafter, the imaged light is photoelectrically converted into an electric signal by the CCD 113, and the signal is electrically read.

Units 301, 302, and 303 of a white reference member provide white reference data used for shading correction, and, before the image of an original is read, the image reading unit (scan unit) 103 is moved up to this position, and shading correction is made.

In addition, a moving original reading glass (transparent glass) 115 is arranged and is located at a reading position in a case where the automatic document feeding device 2 is mounted. An original fed from a feed portion (not illustrated in the figure) of the automatic document feeding device 2 passes through the moving original reading glass 115, and image information of the original is read by the image reading unit 103 that stops and is positioned below the moving original reading glass 115. Furthermore, an inclined guide 116 is a guide member used for lifting the front end of the original passing through the moving original reading glass 115 and guiding the original to the inside of the automatic document feeding device again.

Next, the shading correction will be described with reference to FIGS. 2 and 4.

The shading correction performed by the image reading unit (scan unit) 103 is performed, as illustrated in FIG. 2, as the image reading unit (scan unit) 103 moves below a shading white board 302 that is installed to be parallel with the original base plate glass 101.

Figure 4:
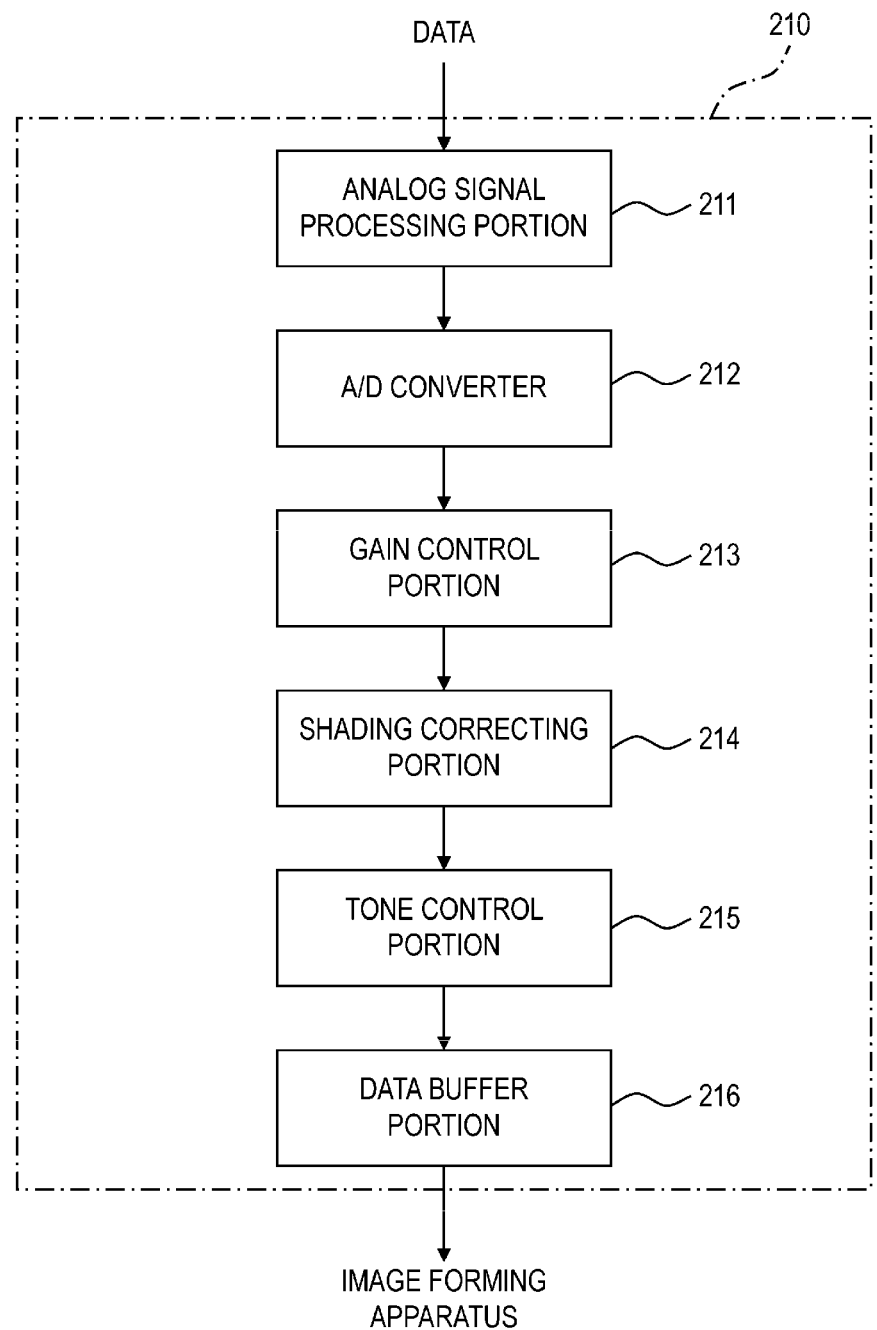
FIG. 4 is a control block diagram of an image processing portion.

Then, as illustrated in FIG. 4, based on the acquired image data, the image processing portion 210 performs various corrections such as a sensitivity correction using an analog signal processing portion 211. Thereafter, in the image processing portion 210, an A/D conversion portion 212 converts the signal into a digital image signal, and various corrections are made for the digital image signal by a gain control portion 213, a shading correction portion 214, a tone control portion 215, and the like. Thereafter, the image data is transferred to an image forming apparatus (not illustrated in the figure) or the like as digital data.

Figure 3:
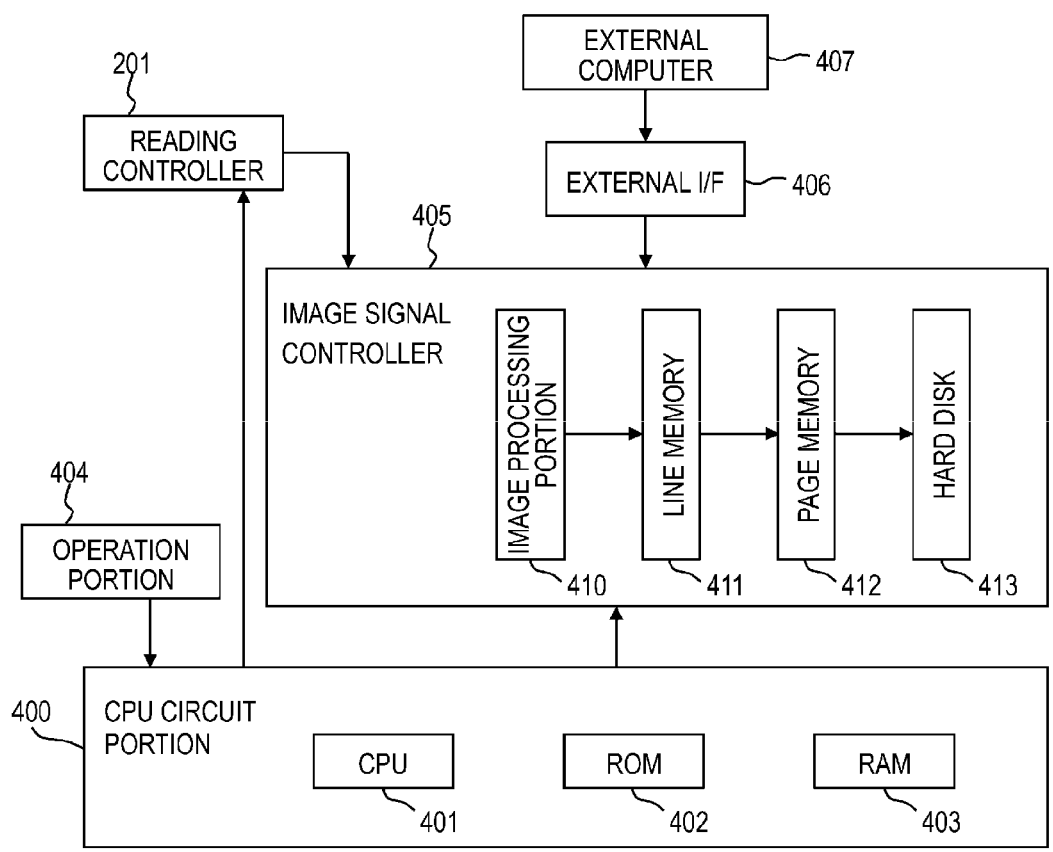
FIG. 3 is a block diagram of the circuit configuration and an image signal controller of the image reading apparatus.

Next, a block diagram relating to the control process of the above-described apparatus will be described with reference to FIG. 3.

A CPU circuit portion 400 includes a CPU 401 and controls a reading controller 201, an image signal controller 405, and an external I/F 406 in accordance with the setting of an operation portion 404 based on a program stored in ROM 402. RAM 403 is used as an area that temporarily stores control data and as a work area of a calculation process accompanied with the control process. The external I/F 406 is an interface from a computer 407 and develops print data into an image and outputs the image to the image signal controller 405.

The image processing portion 410 performs an image correction process or an editing process according to the setting of the operation portion. A line memory 411 performs a mirror image process for changing the main scanning direction and the like. The image stored in the line memory 411 is output through a page memory 412. A hard disk 413 is used as is necessary when the page sequence is changed or the like.

Next, the configurations of the hinge device, the holding portion, and the handle portion according to this embodiment will be described with reference to FIGS. 5 to 10B.

Figure 5:
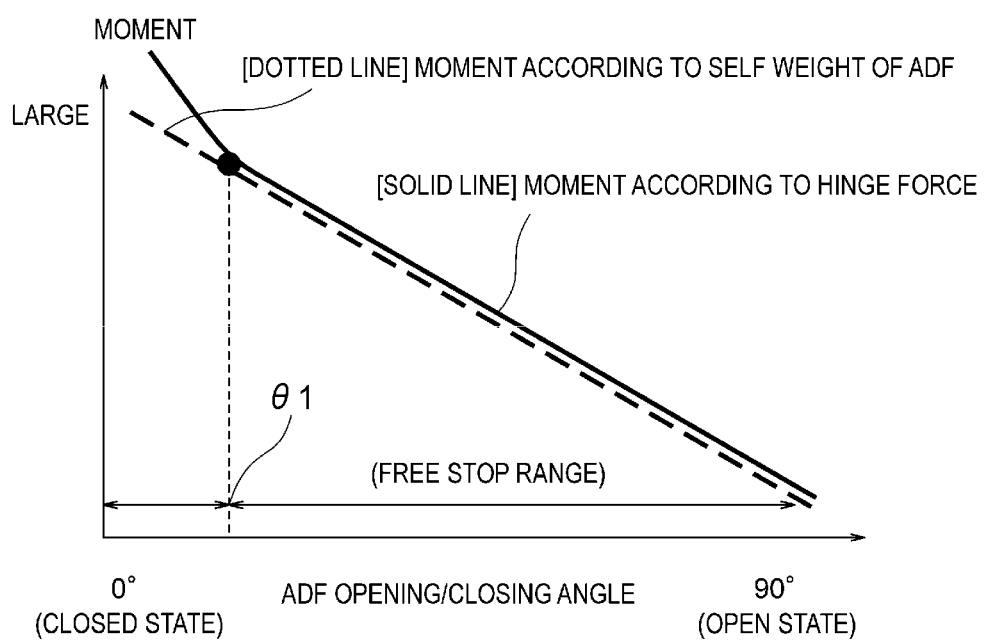
FIG. 5 is a diagram that illustrates relation between the self-weight of an automatic document feeding device and a spring force of a hinge device.

FIG. 5 is a diagram that illustrates magnitude relation between the self-weight of the automatic document feeding device 2 and the spring force of the hinge device by using moment in a case where the hinge device according to this embodiment is used. The horizontal axis represents the rotation angle (opening/closing angle) of the automatic document feeding device 2 with respect to the original base plate glass 101, and the vertical axis represents the moment (a biasing force or a spring force). In the figure, a dotted line represents moment according to the self-weight of the automatic document feeding device 2, and a solid line represents moment according to the spring force of the hinge device. In a range from the closed state to a predetermined rotation angle $\theta 1$, the moment according to the spring force of the hinge device is configured to be higher than the moment according to the self-weight of the automatic document feeding device 2. In a range of a rotation angle $\theta 2$ for which the automatic document feeding device is open more than the predetermined rotation angle $\theta 1$, the moment according to the self-weight of the automatic document feeding device 2 and the moment according to the spring force of the hinge device are set to be balanced. Accordingly, when the automatic document feeding device 2 is open, up to the predetermined rotation angle $\theta 1$, the automatic document feeding device 2 can be opened with a light force, and, in a state in which the automatic document feeding device is open more than the predetermined rotation angle $\theta 1$, the automatic document feeding device 2 can be stopped at a position desired by a user.

Figure 6:
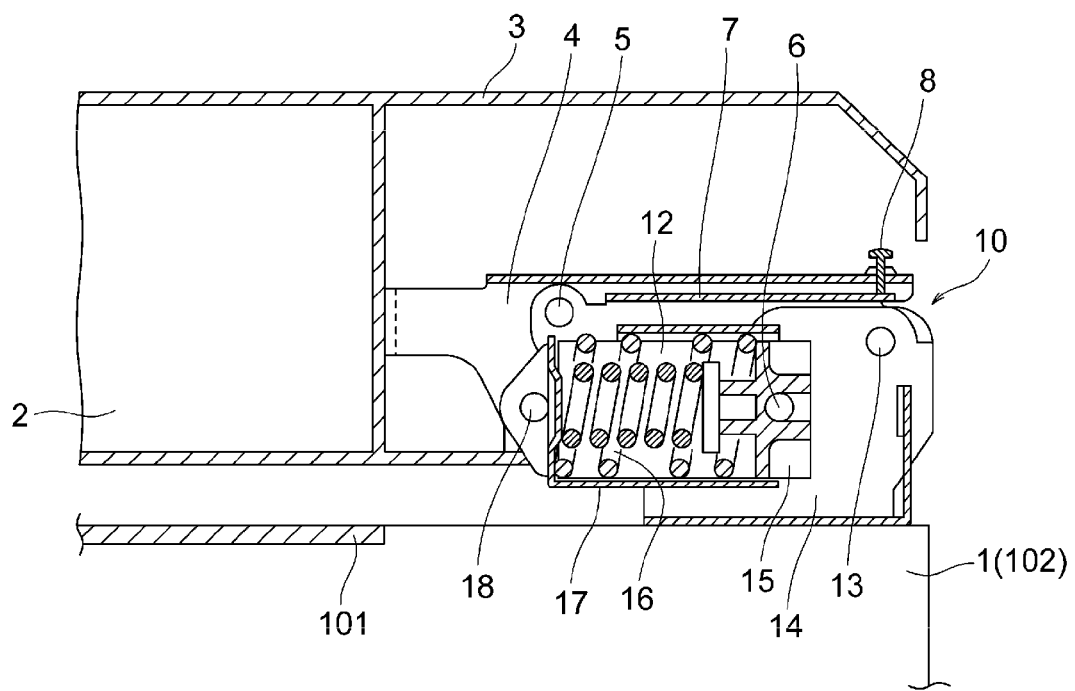
FIG. 6 is a cross-sectional view that illustrates the configuration of a hinge device according to a first embodiment.

FIG. 6 is a cross-sectional view of the hinge device 10 according to this embodiment. The automatic document feeding device 2 is covered with a cover 3 that is an exterior configuring member. The automatic document feeding device 2 is attached to the apparatus main body 1 (casing frame 102) through the hinge device 10 so as to be opened or closed with respect to the original base plate glass 101. The hinge device 10 supports the automatic document feeding device 2, which is an opening/closing member, to be opened or closed with respect to the casing frame 102 that is the main body frame of the apparatus main body 1.

The hinge device 10 includes: a hinge base 14 that is a first attachment member; a hinge arm 7 that configures a second attachment member; a lift arm 4; and a hinge shaft 13 that is connected to the hinge base 14 so as to allow the hinge arm 7 to be rotatable with respect to the hinge base. In addition, the hinge device 10 includes a biasing portion that is expanded or contracted in accordance with the rotation angle of the automatic document feeding device with respect to the apparatus main body 1 and applies a force to the automatic document feeding device 2 in an opening direction. The biasing portion is disposed between the hinge base 14 and the hinge arm 7. Here, the biasing portion includes a compression spring 16 that is a first elastic member and a compression spring 12 that is a second elastic member and further includes a lower spring shaft portion 6, a lower spring holder portion 15, a upper spring holder portion 17, and a upper spring shaft portion 18.

The hinge shaft 13 is supported by the hinge base 14 that is the first attachment member, and the hinge base 14 is fixed to the apparatus main body 1 (casing frame 102). In addition, since the hinge shaft 13 axially supports the hinge arm 7 configuring the second attachment member, the hinge arm 7 is rotatable with respect to the hinge base 14.

In addition, since the hinge arm 7 configuring the second attachment member supports the lift arm 4 configuring the second attachment member through the lift shaft 5, the lift arm 4 is rotatable with respect to the hinge arm 7. While a height adjustment screw 8 is fixed to the lift arm 4, the height adjustment screw 8 is freely movable back and forth, and the front end abuts a part of the hinge arm 7, whereby the height of the automatic document feeding device 2 with respect to the original base plate glass 101 can be adjusted. The lift arm 4 is fixed to the automatic document feeding device 2 (cover 3).

The lift arm 4 supports the upper spring shaft portion 18. The upper spring shaft portion 18 axially supports the upper spring holder portion 17. The upper spring holder portion 17 holds one end portion of each one of the compression springs 12 and 16, and the lower spring holder portion 15 is arranged on the opposing side so as to hold the other end of each one of the compression springs 12 and 16. The lower spring holder portion 15 is axially supported by the lower spring shaft portion 6. The lower spring shaft portion 6 is fixed to the hinge base 14. Accordingly, a gap between the upper spring shaft portion 18 and the lower spring shaft portion 6 changes in the opening/closing operation of the automatic document feeding device 2, and the compression springs 12 and 16 are expanded and contracted in accordance therewith.

Figure 7:
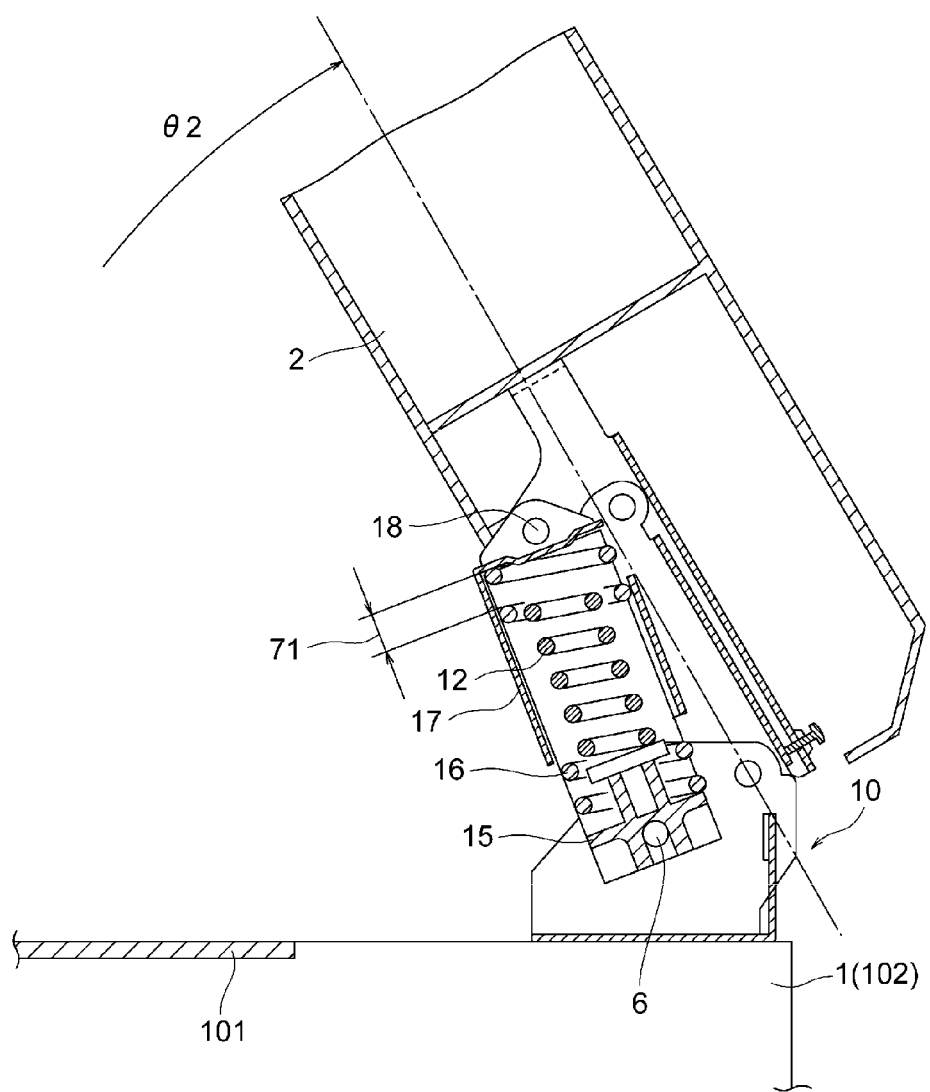
FIG. 7 is a cross-sectional view that illustrates a free stop state of the hinge device according to the first embodiment.
Figure 8:
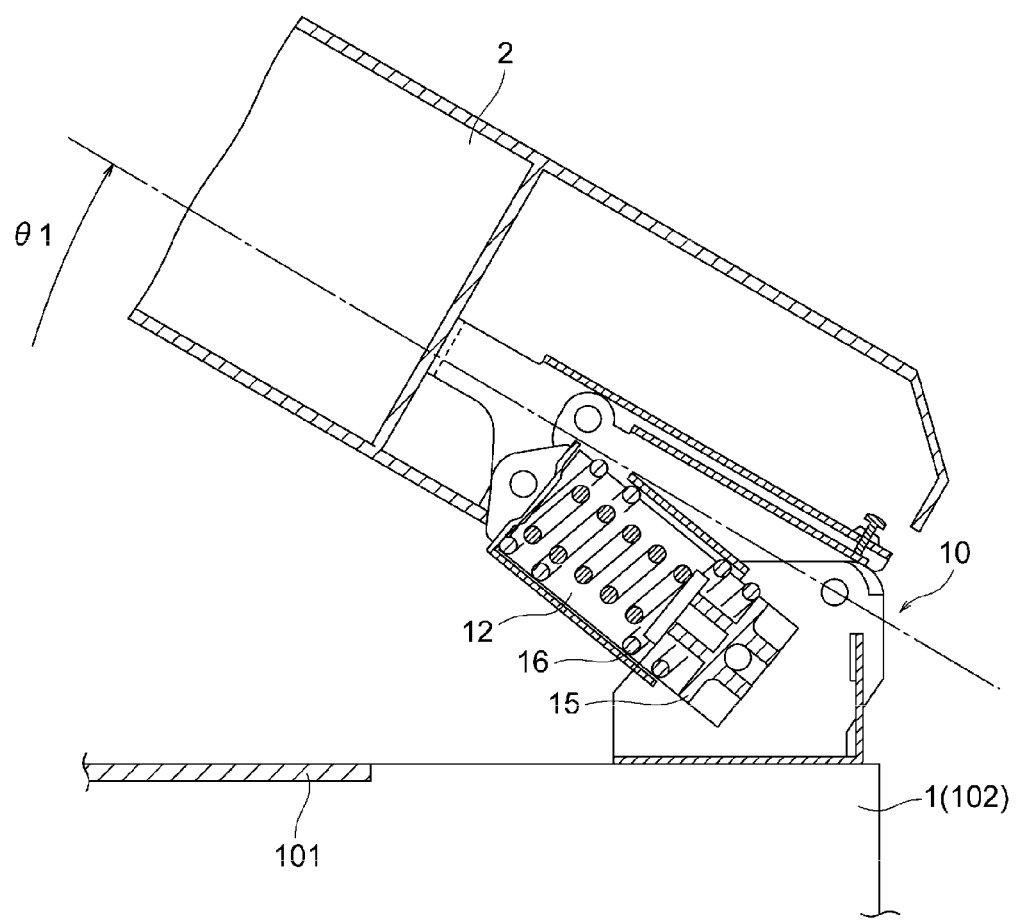
FIG. 8 is a cross-sectional view that illustrates a tip-up state of the hinge device according to the first embodiment.

FIGS. 7 and 8 are cross-sectional views of the hinge device 10 in a case where the automatic document feeding device 2 is open up to angles θ2 and θ1. By opening the automatic document feeding device 2, a gap between the lower spring shaft portion 6 and the upper spring shaft portion 18 increases, and the reaction forces of the compression springs 12 and 16 are received, whereby a gap between the upper spring holder portion 17 and the lower spring holder portion 15 increases in accordance therewith.

As illustrated in FIGS. 7 and 8, in a case where the rotation angle (opening/closing angle) is any one of θ1 and θ2, both ends of the compression spring 16 that is the first elastic member are in contact with the upper spring holder portion 17 and the lower spring holder portion 15. Accordingly, in the case where the rotation angle is any one of θ1 and θ2, the compression spring 16 acts as a biasing force for applying a force to the automatic document feeding device 2 in the opening direction.

In contrast to this, up to the predetermined rotation angle θ1 from the state in which the automatic document feeding device 2 is closed with respect to the apparatus main body 1, both ends of the compression spring 12 that is the second elastic member are in contact with the upper spring holder portion 17 and the lower spring holder portion 15 (see FIG. 8). However, at the rotation angle θ2 for which a state is formed in which the automatic document feeding device is open more than the predetermined rotation angle θ1, only the compression spring 16 is in contact with the upper spring holder portion 17 and the lower spring holder portion 15, and one end portion of the compression spring 12 is configured to be separated from the upper spring holder portion 17 (see FIG. 7).

In other words, as illustrated in FIG. 8, up to the rotation angle θ1 from the closed state, the compression spring 12 acts together with the compression spring 16, and the moment of the hinge shaft rotation according to the hinge device 10 is higher than the moment according to the self-weight of the automatic document feeding device 2. Accordingly, between the closed state of the automatic document feeding device 2 and up to the rotation angle θ1, the automatic document feeding device 2 is opened in accordance with the forces of the compression springs 16 and 12. Accordingly, up to the rotation angle θ1 from the closed state, the opening/closing force of the automatic document feeding device 2 can be reduced.

On the other hand, as illustrated in FIG. 7, at the rotation angle θ2 for which a state is formed in which the automatic document feeding device 2 is open more than the rotation angle θ1, the compression spring 12 does not act, but only the compression spring 16 acts, and accordingly, a state is formed in which the moment of the hinge shaft rotation according to the hinge device 10 (compression spring 16) and the moment according to the self-weight of the automatic document feeding device 2 are balanced. Accordingly, in the range of the rotation angle θ2, the automatic document feeding device 2 can be freely stopped at a free angle. Here, the state in which the moment according to the spring force of the compression spring 16 of the hinge device and the moment according to the self-weight of the automatic document feeding device 2 are balanced not only represents a state in which the magnitudes of the moments are precisely the same but also includes the following state. In other words, a state in which a force causing the automatic document feeding device 2 to rotate in accordance with a difference between the moment according to the spring force of the compression spring 16 and the moment according to the self-weight of the automatic document feeding device 2 is less than frictional resistance relating to the rotation of the automatic document feeding device 2, and the state in which the automatic document feeding device 2 stops unless an external force is added to the automatic document feeding device 2 is also the state in which the two moments are balanced.

Figure 9A:
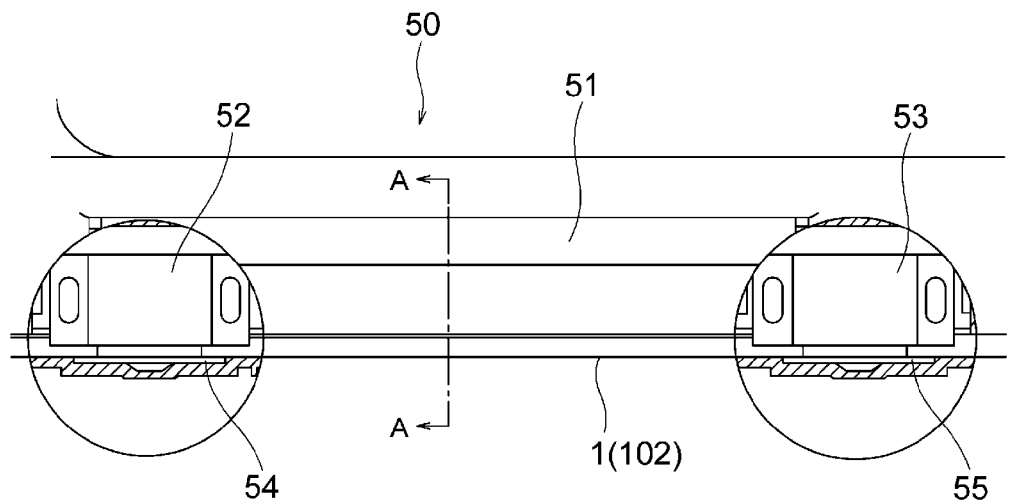
FIG. 9A is a diagram that illustrates the configuration of a handle portion.
Figure 9B:
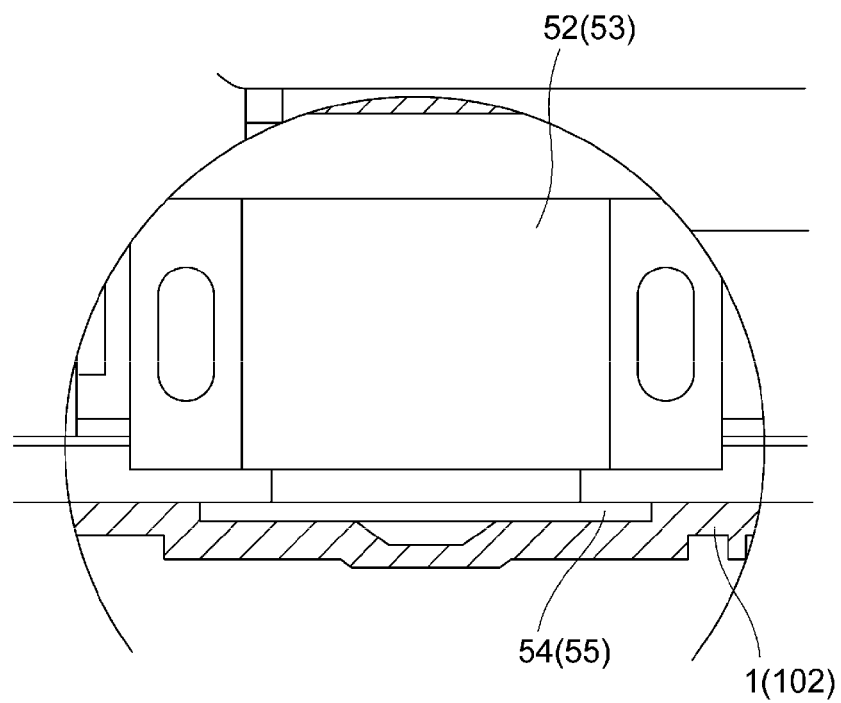
FIG. 9B is an enlarged view of a main part of the handle portion.
Figure 10A:
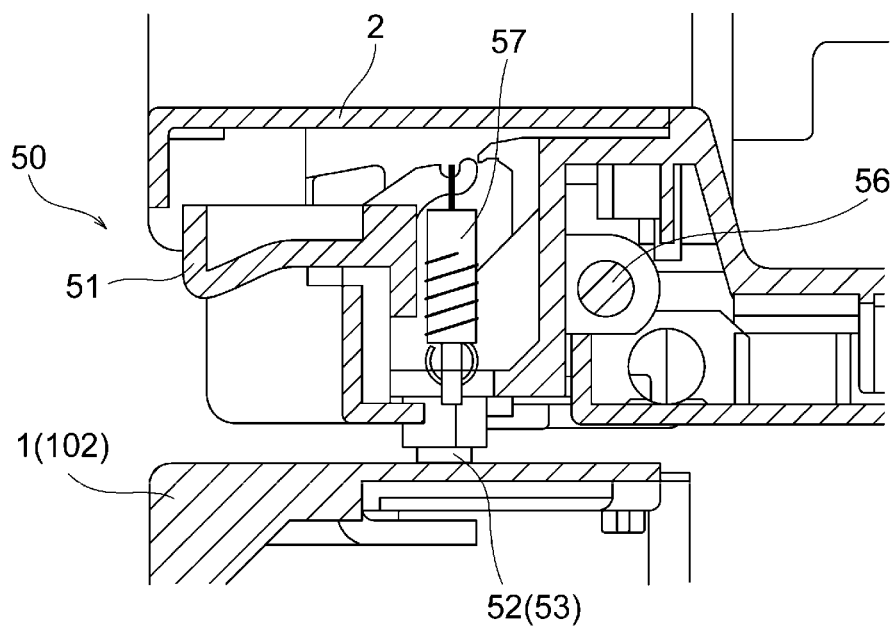
FIGS. 10A and 10B are diagrams that illustrate a holding portion according to the first embodiment (the configuration of a magnet).
Figure 10B:
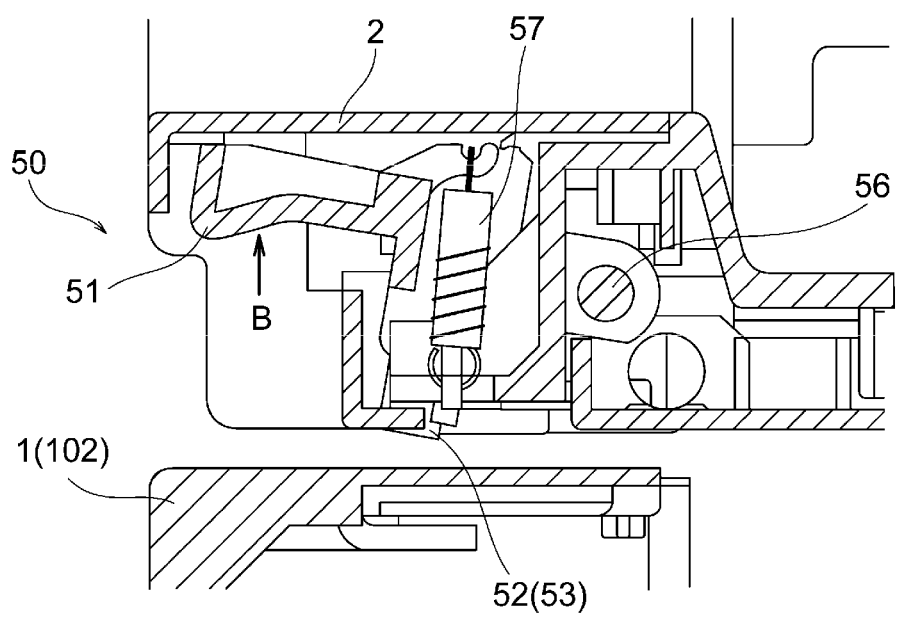

FIGS. 9A and 9B are diagrams in which a portion near the handle portion 50 positioned at the approximately center portion of the front face of the automatic document feeding device 2 is extracted. FIG. 9A is a front view of a portion near the handle portion, and FIG. 9B is an enlarged view of the holding portion. FIGS. 10A and 10B are cross-sectional views taken along line A-A represented in FIG. 9A. FIG. 10A is a diagram that illustrates a state (closed state) in which the automatic document feeding device 2 is held by the holding portion with respect to the apparatus main body (casing frame 102), and FIG. 10B is a diagram that illustrates a state in which the holding portion is released.

The handle portion 50 is used for opening the automatic document feeding device 2 and is disposed at the approximately center portion of the front face of the automatic document feeding device 2. The handle portion 50 includes a handle 51 that serves as a grip when a user opens or closes the automatic document feeding device 2. The handle 51 is attached to the automatic document feeding device 2 to be rotatable with respect to the automatic document feeding device using a rotation shaft 56. As illustrated in FIG. 10B, the rotated handle 51 is configured to be returned to the original position (a position illustrated in FIG. 10A) by a return spring 57.

At both ends of the handle 51, magnets (magnet catchers) 52 and 53 that configure the holding portion are disposed. In the apparatus main body 1 (the casing frame 102) that is on the opposite side of the magnets 52 and 53, magnetic bodies 54 and 55 such as metal plates that configure the holding portion are disposed. The automatic document feeding device 2 maintains the closed state with respect to the apparatus main body 1 (the casing frame 102) depending on a magnetic coupling force according to the magnets 52 and 53 and the magnetic bodies 54 and 55 as the holding portions. The reason for disposing the holding portions on both end sides with the handle 51 being nipped therebetween is to maintain the automatic document feeding device 2 to be parallel to the apparatus main body 1 (the casing frame 102 and the original base plate glass 101). Although not illustrated in the figure, by arranging a unit that adjusts the attaching positions (heights) of the magnets 52 and 53, the parallel state can be adjusted.

When the automatic document feeding device 2 is opened or closed, as illustrated in FIG. 10B, the handle 51 is pressed in the direction of the arrow B. Accordingly, the handle 51 rotates around the rotation shaft 56, and the magnets 52 and 53 attached to the handle 51 are separated away from the magnetic bodies 54 and 55 attached to the apparatus main body 1 (the casing frame 102), whereby the magnetic coupling force is released. When the magnetic coupling force is released, the automatic document feeding device 2 can be lifted up to the position of the rotation angle $\theta1$ by using only the spring force of the hinge device 10 (the compression springs 12 and 16).

Here, the positions of the handle 51, the holding portions 52 to 55, and the rotation shaft 56 will be described. As described above, in order to securely maintain the automatic document feeding device 2 with respect to the apparatus main body 1 (the casing frame 102), a predetermined force (for example, a force of about 2 to 3 Kgf as a whole) is necessary at the position of the handle 51. In other words, also in this embodiment, a magnetic coupling force of about 2 to 3 Kgf is necessary. In this embodiment, as illustrated in FIGS. 10A and 10B, the magnets 52 and 53 and the magnetic bodies 54 and 55 configuring the holding portions are arranged between the handle 51 and the rotation shaft 56, and these holding portions are arranged as close to the side of the rotation shaft 56. Accordingly, by using the principle of leverage, the holding force (magnetic coupling force) according to the holding portions can be easily released.

In this embodiment, as the holding portions, while the magnets 52 and 53 are disposed on the side of the automatic document feeding device 2, and the magnetic bodies 54 and 55 are disposed on the side of the apparatus main body 1 (the casing frame 102), the holding portions may be respectively arranged on opposite sides. In other words, the holding portions may have a configuration in which the magnets 52 and 53 are disposed on the side of one of the apparatus main body 1 and the automatic document feeding device 2, the magnetic bodies 54 and 55 are disposed on the side of the other, and the automatic document feeding device is maintained to be in the closed state (position) with respect to the apparatus main body in accordance with the magnetic coupling force.

Here, while two magnets and two magnetic bodies have been described to be arranged on both sides of the handle 51, the numbers of the magnets and the magnetic bodies are not limited to two. In addition, while the handle 51 has been described as being configured to be rotated using the rotation shaft 56, the configuration is not limited thereto as long as the holding portions can be retracted.

In addition, in this embodiment, while the handle portion 50 is disposed on the side of the automatic document feeding device 2, the handle portion 50 may be disposed on the side of the apparatus main body 1, and a configuration may be employed in which the holding state according to the holding portions can be released.

According to this embodiment, in the range up to the predetermined rotation angle $\theta1$ from the closed state of the automatic document feeding device 2 with respect to the apparatus main body 1, the moment (biasing force) of the hinge shaft rotation according to the biasing portion is higher than the moment of the hinge shaft rotation according to the self-weight of the automatic document feeding device 2. Accordingly, the automatic document feeding device 2 that is the opening/closing member can be opened using a weak force.

In addition, in the range of the rotation angle $\theta2$ for which the automatic document feeding device 2 is open with respect to the apparatus main body 1 more than the case of the predetermined rotation angle $\theta1$, the moment (biasing force) of the hinge shaft rotation according to the biasing portion and the moment of the hinge shaft rotation according to the self-weight of the automatic document feeding device 2 are balanced. Accordingly, the automatic document feeding device 2 can be freely stopped at an arbitrary position, whereby the user's operability can be improved.

In this embodiment, in order to maintain the balanced state, as illustrated in FIG. 5, the moment of the hinge shaft rotation according to the biasing portion is set to be slightly higher than the moment of the hinge shaft rotation according to the self-weight of the automatic document feeding device 2. The reason for this is that a change in the moment due to a variation of the self-weight of the automatic document feeding device 2 has been considered. In addition, in a case where the frictional resistance occurring when the hinge device rotates is high, the moment of the hinge shaft rotation according to the biasing portion may be set to be equal to or slightly lower than the moment of the hinge shaft rotation according to the self-weight of the automatic document feeding device 2.

Second Embodiment

Next, a hinge device and holding portions according to a second embodiment will be described with reference to FIGS. 11 to 13. Since configurations other than the hinge device and the holding portions are the same as those of the above-described embodiment, the same reference sign is assigned to portions having the same function and the same configuration, and description thereof will not be presented.

Figure 11:
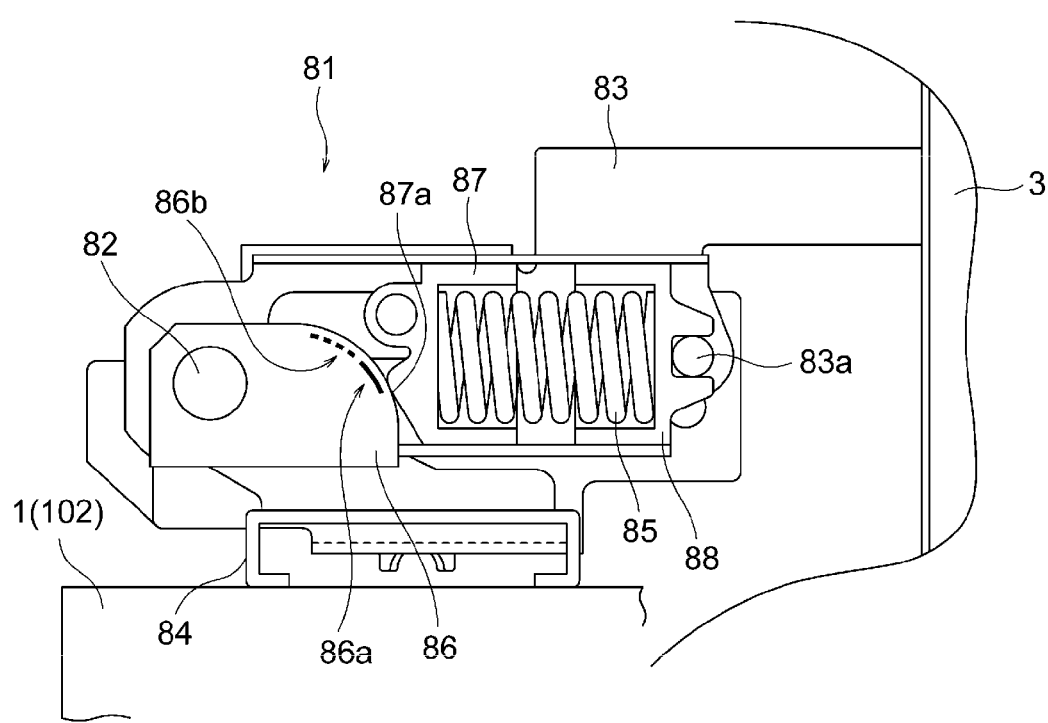
FIG. 11 is a cross-sectional view that illustrates a closed state of a hinge device according to a second embodiment.
Figure 12:
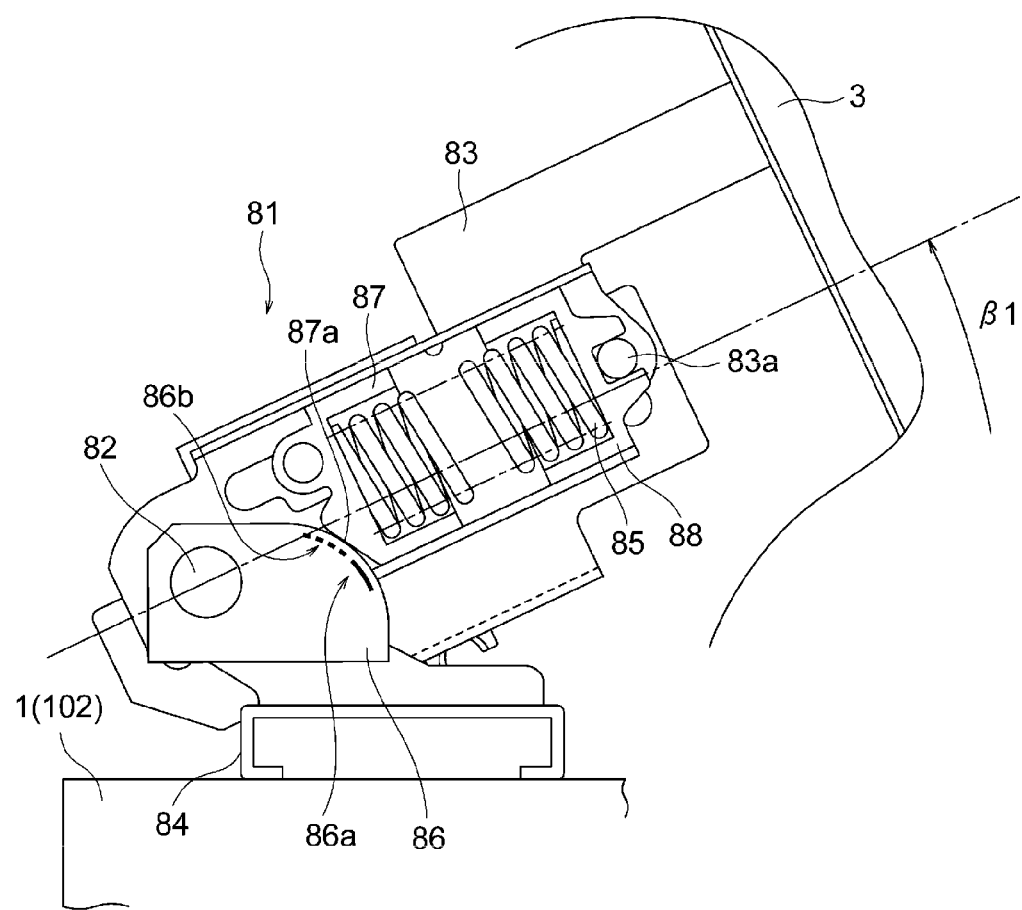
FIG. 12 is a cross-sectional view that illustrates an open state of the hinge device according to the second embodiment.

FIGS. 11 and 12 are cross-sectional views of the hinge device 81 according to this embodiment. The hinge device 81 includes first and second attachment members 83 and 84 that are connected to a rotation shaft (hinge shaft) 82 so as to be relatively freely rotatable and a compression spring 85 that is an elastic member expanding or contracting in accordance with the rotation of the first and second attachment members 83 and 84. In addition, a cam member 86 is fixed to the second attachment member 84. An abutting portion 87a of a housing 87 housing the compression spring 85 that is one end of the elastic member is brought into contact with cam faces 86a and 86b of the cam member 86 so as to slide.

The first attachment member 83 configuring the hinge device 81 is fastened and fixed to the automatic document feeding device 2 by a fastening portion such as a screw not illustrated in the figure and rotates around the rotation shaft 82 together with the automatic document feeding device 2. In addition, the second attachment member 84 that is connected to the first attachment member 83 through the rotation shaft 82 is fixed to the apparatus main body 1 (the casing frame 102).

One end of the compression spring 85 that is the elastic member expanding or contracting in accordance with the rotation of the first and second attachment members 83 and 84 abuts the cam face of the cam member 86 fixed to the second attachment member 84 through the housing 87 so as to be in contact therewith and slide. In addition, the other end of the cam member 86 is locked into a shaft 83a fixed to the first attachment member 83 through a housing 88 so as to be fixed thereto.

The shape of the cam face of the cam member 86 is appropriately set in consideration of the moment according to the self-weight of the automatic document feeding device 2 around the rotation shaft 82 and a desired opening/closing operation condition such as "a specific angle at which the automatic document feeding device stops" or "a specific angle from which the automatic document feeding device falls in accordance with the self-weight". In this embodiment, the cam face is divided into two areas including a first cam face 86a as a first area and a second cam face 86b as a second area, and the cam faces are set so as to satisfy the following opening/closing operation condition.

The first cam face (first area) 86a of the cam member 86 is in contact with the abutting portion 87a of the housing 87 in the range of the rotation angles 0 degrees to β1 (corresponding to the rotation angle θ1 of the first embodiment). This first cam face 86a causes the moment according to the spring force of the hinge device higher than the moment according to the self-weight of the automatic document feeding device 2 to be generated. Accordingly, when the automatic document feeding device 2 is opened, the opening operation can be performed using a weak force.

The second cam face (second area) 86b of the cam member 86 is brought into contact with the abutting portion 87a of the housing 87 in the range of the rotation angle β2 for which the automatic document feeding device 2 is open more than the case of the rotation angle β1. This second cam face 86b is in a state in which the moment according to the self-weight of the automatic document feeding device 2 and the moment according to the spring force of the hinge device are balanced. Accordingly, the automatic document feeding device 2 can be stopped at a position desired by the user.

Figure 13A:
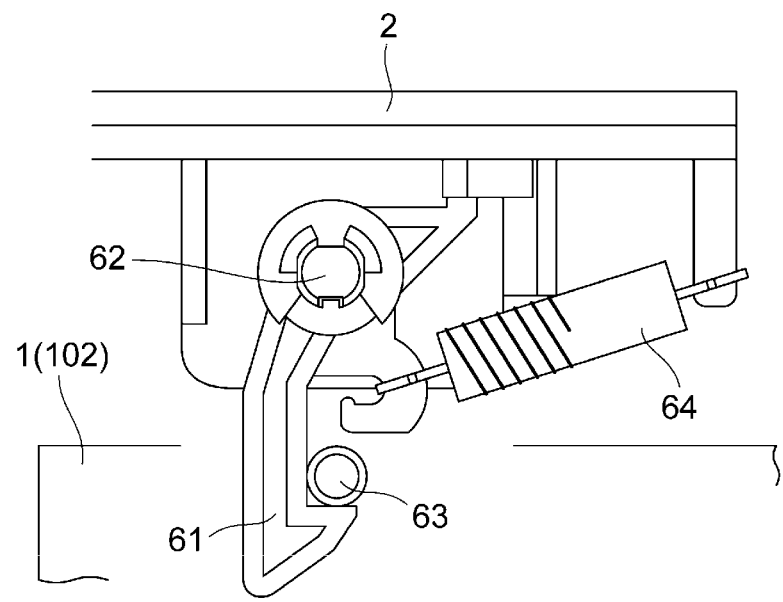
FIG. 13 is a diagram that illustrates a holding portion according to the second embodiment (the configuration of a latch).
Figure 13B:
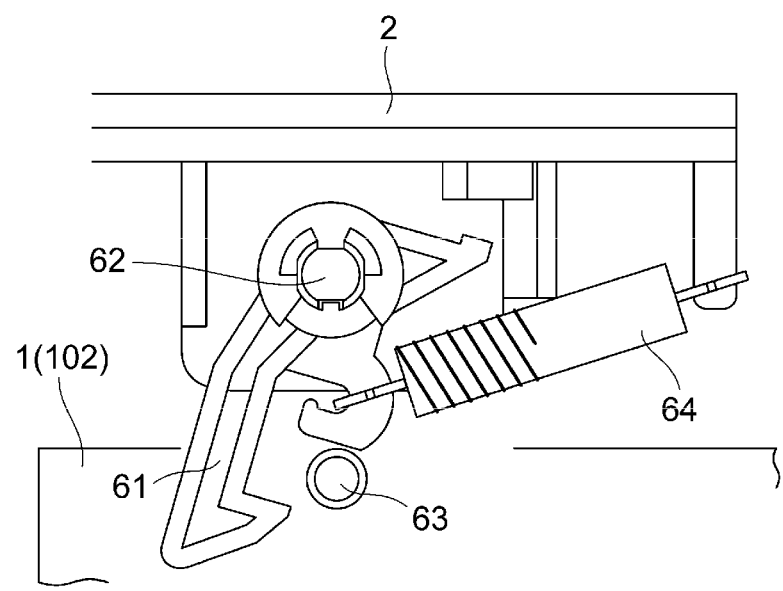

FIGS. 13A and 13B illustrates the configuration of the holding portion. The configuration of the handle portion is the same as that of the first embodiment described above, and only a part that is different from that of the first embodiment will be described. First, a locking projection 61 is a hook member disposed on the side of the automatic document feeding device 2, and a pin 63 is a hook supporting portion disposed on the side of the apparatus main body 1 (the casing frame 102). The locking projection 61 configuring this holding portion is fixed to the rotation shaft 62, and a handle 51 (the same configuration as that of the first embodiment and thus is not illustrated in the figure) is additionally fixed to the rotation shaft 62. In other words, a configuration is employed in which, similar to the first embodiment, by pressing the handle 51 in the direction of arrow B illustrated in FIG. 10B, as illustrated in FIG. 13B, the rotation shaft 62 and the locking projection 61 are rotated so as to release a connection with the pin 63. When the connection is released, the automatic document feeding device 2 can be lifted using only the spring force of the hinge device up to a position of the rotation angle β1. Thereafter, the locking projection 61 is returned to the original position by the spring 64. The locking projection 61 and the pin 63, similar to the first embodiment described above, in order to hold the automatic document feeding device 2 parallel to the apparatus main body 1 (the casing frame 102 and the original base plate glass 101), are disposed on both sides of the handle 51 (not illustrated in the figure).

In this embodiment, while the locking projection 61 (hook member) is disposed on the side of the automatic document feeding device 2, and the pin 63 (hook supporting portion) is disposed on the side of the apparatus main body 1 (the casing frame 102) as the holding portions, the hook member and the hook supporting portion may be respectively arranged on the opposite sides thereof. In other words, a configuration of the holding portions may be employed in which the hook member is disposed on the side of one of the apparatus main body 1 and the automatic document feeding device 2, the hook supporting portion is disposed on the side of the other, and the automatic document feeding device is maintained to be in the closed state with respect to the apparatus main body by locking the hook member into the hook supporting portion.

In addition, while two locking projections 61 and two pins 63 configuring the holding portions are arranged on both sides of the handle 51, the numbers of the locking projections and the pins are not limited thereto.

In the first and second embodiments, instead of a configuration in which the automatic document feeding device 2 is caused to fall in accordance with the self-weight with respect to the apparatus main body (the casing frame 102), the configuration is employed in which the automatic document feeding device 2 is closed by the user. Accordingly, a shock absorber used in the hinge of the conventional example, in other words, an impact mitigating portion such as an oil damper is not necessary, which can contribute to reduced costs.

Also in this embodiment, in the range up to the predetermined rotation angle β1 from the closed state of the automatic document feeding device 2 with respect to the apparatus main body 1, the moment (biasing force) of the hinge shaft rotation according to the biasing portion is higher than the moment of the hinge shaft rotation according to the self-weight of the automatic document feeding device 2. Accordingly, the automatic document feeding device 2 that is the opening/closing member can be opened easily.

In addition, in the range of the rotation angle β2 for which the automatic document feeding device 2 is open with respect to the apparatus main body 1 more than the case of the predetermined rotation angle β1, the moment (biasing force) of the hinge shaft rotation according to the biasing portion and the moment of the hinge shaft rotation according to the self-weight of the automatic document feeding device are balanced. Accordingly, the automatic document feeding device 2 can be freely stopped at an arbitrary position, whereby the user's operability can be improved.

Third Embodiment

Next, an adjustment portion of a hinge device according to a third embodiment will be described with reference to FIGS. 14A to 16. Since configurations other than the adjustment portion are the same as those of the above-described first embodiment, the same reference sign is assigned to portions having the same function and the same configuration, and description thereof will not be presented.

In the third embodiment, in addition to the configuration of the first embodiment described above, an adjustment portion that can adjust the position of the compression spring 12 configuring the hinge device in the expanding/contracting direction is included. Since configurations other than the adjustment portion are the same as those of the above-described first embodiment, the same reference sign is assigned to portions having the same function and the same configuration, and description thereof will not be presented.

Figure 14A:
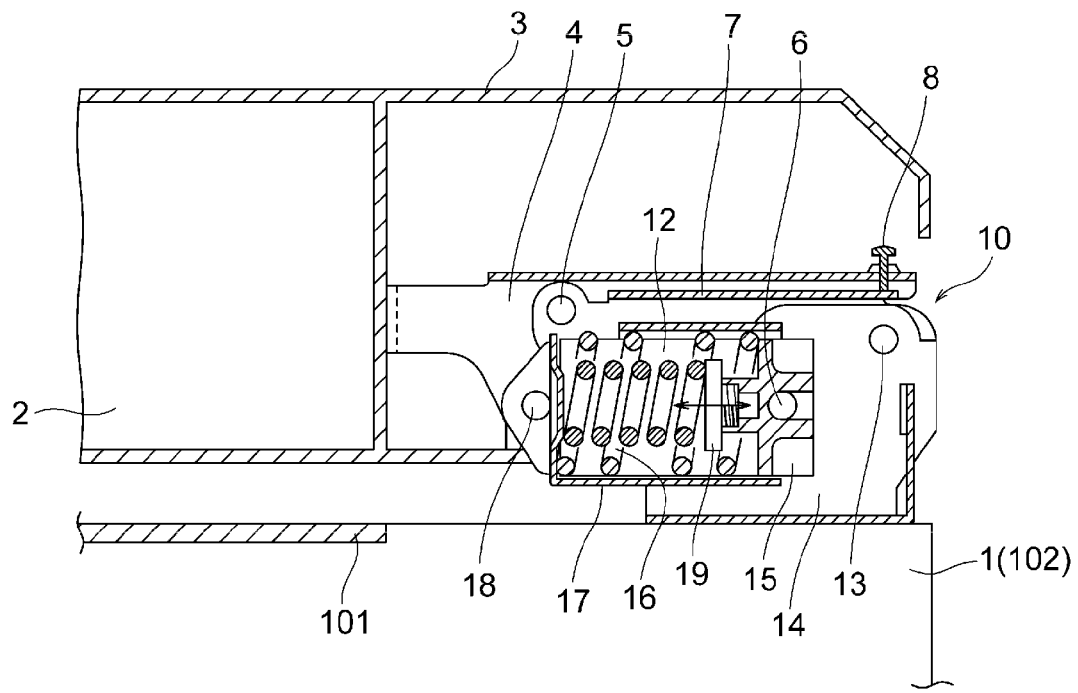
FIGS. 14A and 14B are cross-sectional views that illustrate the configuration of a hinge device according to a third embodiment.
Figure 14B:
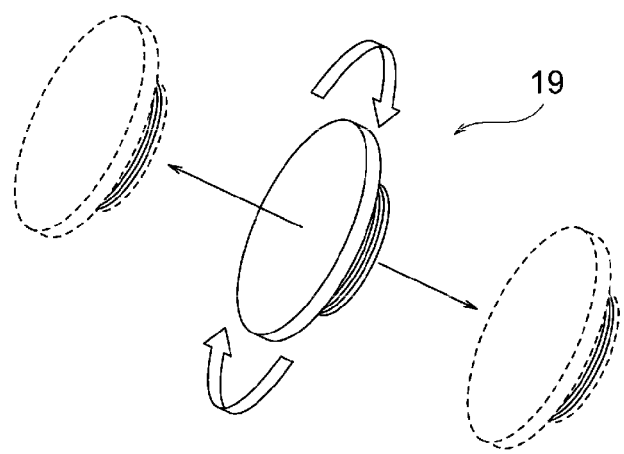

In this embodiment, as illustrated in FIGS. 14A and 14B, an adjustment portion 19 that can adjust the position (height) of a compression spring 12 in the expanding/contracting direction is disposed on the side of a lower spring holder portion 15 so as to be in contact with the compression spring (second elastic member) 12 of a hinge device 10. As illustrated in FIG. 14B, the adjustment portion 19 has cut screw threads on the outer circumference and can move the position of the compression spring (second elastic member) 12 in the expanding/contracting direction by using an adjustment tool (not illustrated in the figure). By changing the position of the compression spring (second elastic member) 12 in the expanding/contracting direction using the adjustment portion 19, a distance 71 between the end portion of the compression spring (second elastic member) 12 illustrated in FIG. 7 and the upper spring holder portion 17 changes. Accordingly, the range up to the predetermined rotation angle θ1 in which the compression spring (second elastic member) 12 starts to act when the automatic document feeding device 2 is closed can be changed.

Figure 15:
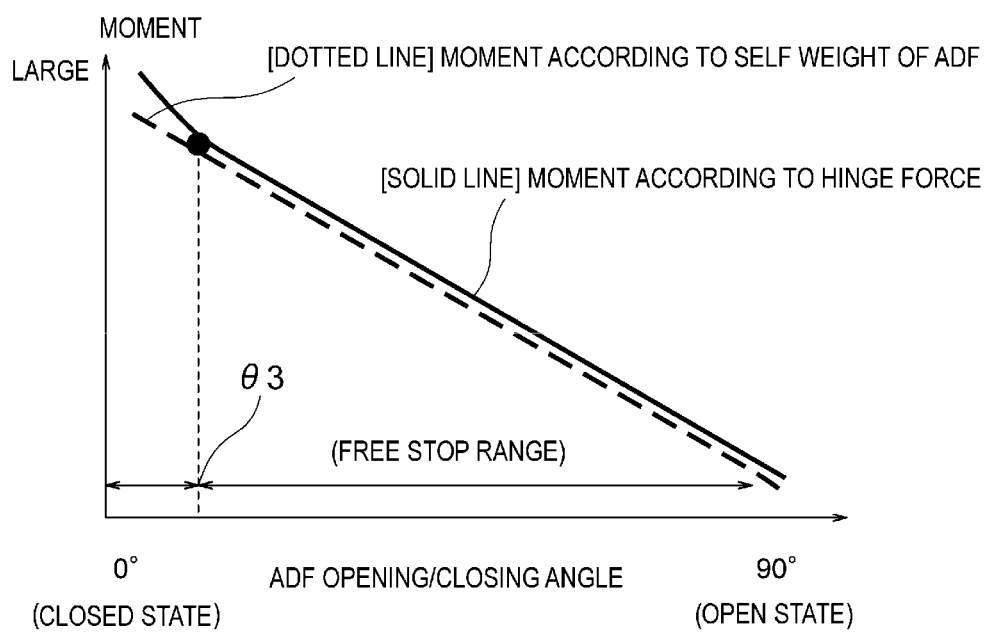
FIG. 15 is a diagram that illustrates relation between the self-weight of the automatic document feeding device and the spring force of the hinge device at the time of moving an adjustment portion to a lower side of the axis.

For example, when the adjustment portion 19 is caused to act in the direction of a lower spring shaft portion 6, the compression spring 12 also moves in the direction of the lower spring shaft portion 6. Accordingly, a distance 71 between the end portion of the compression spring 12 and a upper spring holder portion 17 increases, and therefore, as illustrated in FIG. 15, the compression spring 12 starts to act at a rotation angle θ3 that is smaller than the rotation angle θ1 (see FIG. 5) before the adjustment. In this embodiment, while the distance 71 between the compression spring 12 and the upper spring holder portion 17 is increased by moving the compression spring 12 in the direction of the lower spring shaft portion 6, the same advantage can be acquired by arranging the adjustment portion on the side of the upper spring shaft portion 18 and positioning the upper spring holder portion 17 to be far from the compression spring 12.

Figure 16:
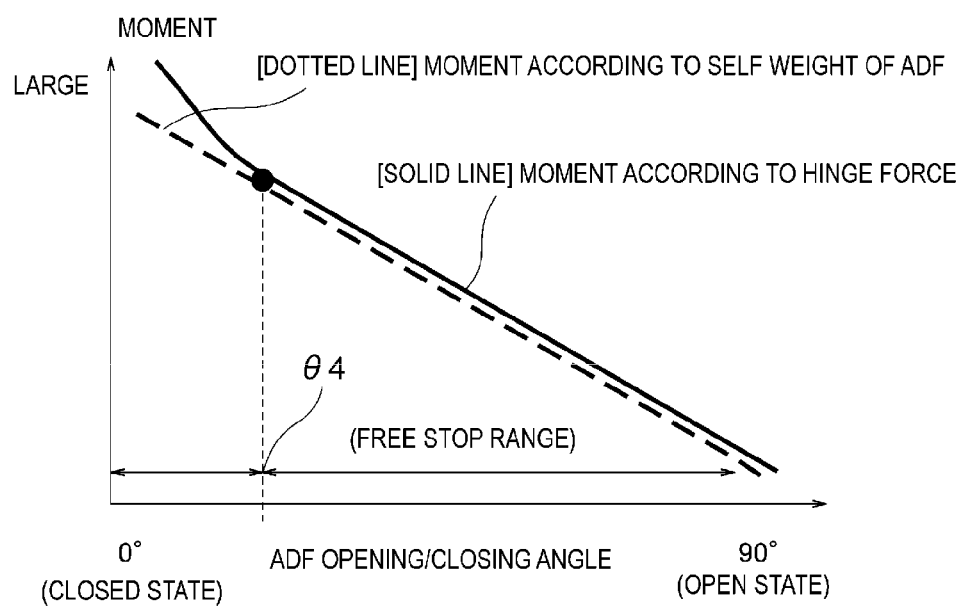
FIG. 16 is a diagram that illustrates relation between the self-weight of the automatic document feeding device and the spring force of the hinge device at the time of moving the adjustment portion to an upper side of the axis.
Figure 17A:
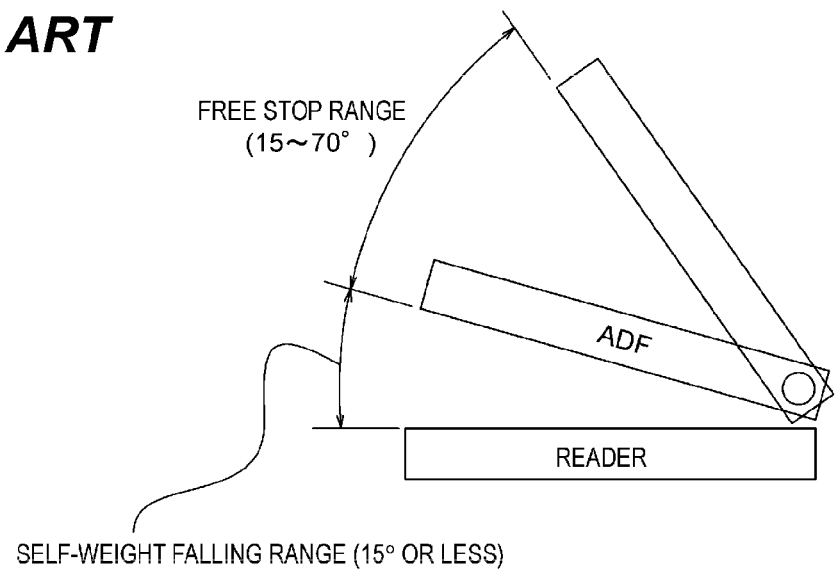
FIGS. 17A and 17B are diagrams that illustrate a conventional example.
Figure 17B:
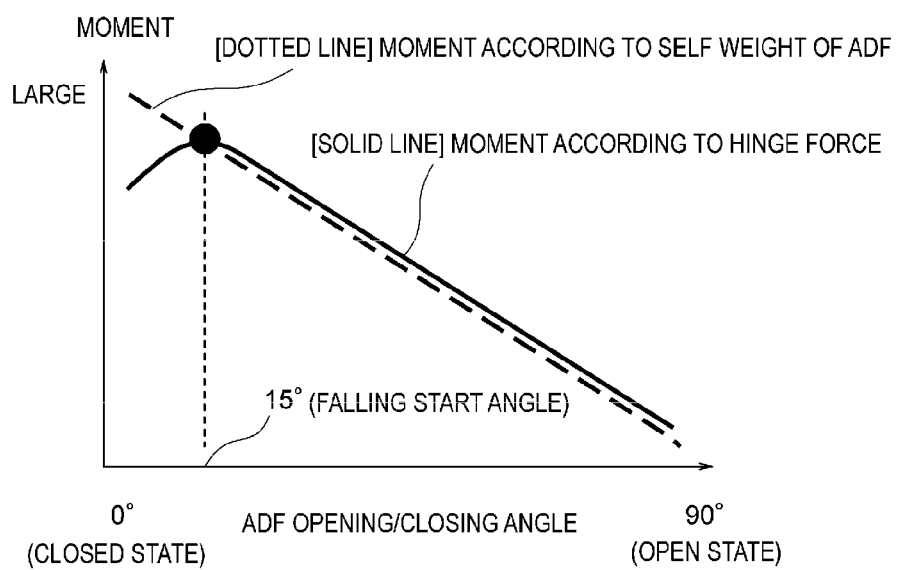

In addition, for example, when the adjustment portion 19 is caused to act in the direction of the upper spring shaft portion 18, the compression spring 12 also moves in the direction of the upper spring shaft portion 18. Accordingly, the distance 71 between the end portion of the compression spring 12 and the upper spring holder portion 17 decreases, and therefore, as illustrated in FIG. 16, the compression spring 12 starts to act at a rotation angle θ4 that is larger than the rotation angle θ1 (see FIG. 5) before the adjustment. In this embodiment, while the distance 71 between the compression spring 12 and the upper spring holder portion 17 is decreased by moving the compression spring 12 in the direction of the lower spring shaft portion 6, the same advantage can be acquired by arranging the adjustment portion on the side of the upper spring shaft portion 18 and approaching the upper spring holder portion 17 to the side of the compression spring 12.

As described above, by disposing the adjustment portion 19 adjusting the position of the compression spring 12 configuring the hinge device in the expanding/contracting direction, the range up to the predetermined rotation angle in which the compression spring (second elastic member) 12 starts to act when the automatic document feeding device 2 is closed can be changed.

In addition, in the above-described embodiments, while the hinge device of the image forming apparatus has been described as an example as the hinge device that supports the opening/closing member to be opened or closed with respect to the apparatus main body, the present invention is not limited thereto. Thus, the hinge device may be a hinge device of an image reading apparatus such as a scanner. Furthermore, in the above-described embodiments, while the copying machine has been described as an example of the image forming apparatus, the present invention is not limited thereto. For example, the image forming apparatus may be another image forming apparatus such as a facsimile device or another image forming apparatus such as a multifunction apparatus combining such functions. By applying the present invention to a hinge device of the image forming apparatus or the image reading apparatus, the same advantages can be acquired.

While the present invention has been described with reference to illustrative embodiments, it is to be understood that the invention is not limited to the disclosed illustrative embodiments. The scope of the following claims is to be accorded the broadest interpretation so as to encompass all modifications, equivalent structures and functions.

This application claims the benefit of Japanese Patent Application No. 2013-124897, filed Jun. 13, 2013, which is hereby incorporated by reference herein in its entirety.

What is claimed is:

1. An image reading apparatus comprising:
an apparatus main body;
an opening/closing portion configured to be rotatable with respect to the main body, around a hinge shaft;
a biasing portion configured to (i) apply a force to the opening/closing portion in an opening direction to generate a moment about the hinge shaft higher than a moment of the self-weight of the opening/closing portion about the hinge shaft in a state in which the opening/closing portion is in a range from a closed position to a predetermined rotation angle with respect to the apparatus main body and (ii) generate a moment about the hinge shaft that is substantially balanced with the moment of the self-weight of the opening/closing portion about the hinge shaft in a state in which the opening/closing portion is opened more than the predetermined rotation angle; and
a holding portion configured to hold the opening/closing portion in a holding state, the holding state being the state of the opening/closing portion at the closed position,
wherein, in a case that the holding state is released, the opening/closing portion rotates from the closed position to the predetermined rotation angle by the force applied by the biasing portion.

2. The image reading apparatus according to claim 1,
wherein the biasing portion includes a first elastic member that applies a force to the opening/closing portion in the opening direction and a second elastic member that applies a force to the opening/closing portion in the opening direction,
wherein, in a range up to the predetermined rotation angle from the closed position of the opening/closing portion with respect to the apparatus main body, both the first elastic member and the second elastic member apply forces to the opening/closing portion in the opening direction, and
wherein, in a state in which the opening/closing portion is opened more than the predetermined rotation angle with respect to the apparatus main body, the second elastic member does not act, but the first elastic member applies a force to the opening/closing portion in the opening direction.

3. The image reading apparatus according to claim 2, wherein the biasing portion includes an adjustment portion configured to adjust the predetermined rotation angle by changing the position of the second elastic member in an expanding/contracting direction.

4. The image reading apparatus according to claim 1,
wherein the biasing portion includes an elastic member configured to apply a force to the opening/closing portion in the opening direction, a housing configured to house the elastic member, and a cam member including first and second cam faces brought into contact with the housing,
wherein, in a state in which the opening/closing portion is placed in a range up to the predetermined rotation angle from the closed position with respect to the apparatus main body, the housing abuts the first cam face of the cam member such that the elastic member generates a moment about the hinge shaft higher than the moment of the self-weight of the opening/closing portion about the hinge shaft, and
wherein, in a state in which the opening/closing portion is opened more than the predetermined rotation angle with respect to the apparatus main body, the housing abuts the second cam face of the cam member such that the elastic member generates a moment about the hinge shaft substantially balanced with the moment of the self-weight of the opening/closing portion about the hinge shaft.

5. The image reading apparatus according to claim 1, wherein the holding portion includes (i) a magnet disposed on one of the apparatus main body and the opening/closing portion and (ii) a magnetic body disposed on the other, the holding portion maintaining the opening/closing portion at the closed position with respect to the apparatus main body using a magnetic coupling force.

6. The image reading apparatus according to claim 1, wherein the holding portion includes (i) a hook member disposed on one of the apparatus main body and the opening/closing portion and (ii) a hook supporting portion disposed on the other, the holding portion maintaining the opening/closing portion at the closed position with respect to the apparatus main body by causing the hook member and the hook supporting portion to be engaged with each other.

7. The image reading apparatus according to claim 1, further comprising a handle portion used for opening the opening/closing portion,
wherein the handle portion is (i) disposed on the side of one of the apparatus main body and the opening/closing portion and (ii) configured to be able to release the closure performed by the holding portion.

8. The image reading apparatus according to claim 1,
wherein the apparatus main body includes an original placement portion on which an original is placed and an image reading unit that reads the original placed on the original placement portion, and
wherein the opening/closing portion is an original feeding device that sends an original to the original placement portion.

9. The image reading apparatus according to claim 1, further comprising:
a first attachment member configured to be fixed to the apparatus main body; and
a second attachment member configured to be fixed to the opening/closing portion,
wherein the hinge shaft is connected to the first attachment member so as to allow the second attachment member to be rotatable with respect to the first attachment member, and
wherein the biasing portion is disposed between the first attachment member and the second attachment member.

10. The image reading apparatus according to claim 1, further comprising a release mechanism configured to release the holding portion from holding the opening/closing portion in the holding state.

11. An image forming apparatus comprising:
an image reading portion configured to read an original; and
an image forming portion configured to form an image on a sheet,
wherein the image reading portion includes:
an apparatus main body including an original placement portion on which the original is placed and an image reading unit that reads the original placed on the original placement portion;
an opening/closing portion to be rotatable around a hinge shaft so as to be opened or closed the original placement portion;
a biasing portion configured to apply a force to the opening/closing portion in an opening direction such that (i) a moment about the hinge shaft higher than a moment of the self-weight of the opening/closing portion about the hinge shaft is generated so as to open the opening/closing portion in a state in which the opening/closing portion is placed in a range from a closed position to a predetermined rotation angle with respect to the apparatus main body and (ii) a moment about the hinge shaft is balanced with the moment of the self-weight of the opening/closing portion about the hinge shaft is generated so as to stop the opening/closing portion in a state in which the opening/closing portion is opened more than the predetermined rotation angle; and
a holding portion configured to hold the opening/closing portion in a holding state, the holding state being the state of the opening/closing portion at the closed position,
wherein, in a case that the holding state is released, the opening/closing portion rotates from the closed position to the predetermined rotation angle by the force applied by the biasing portion.

12. An image reading apparatus comprising:
an apparatus main body;
an opening/closing portion configured to be rotatable with respect to the main body around a hinge shaft;
a biasing portion configured to apply a force to the opening/closing portion in an opening direction such that (i) the opening/closing portion is rotated to a predetermined rotation angle in a state in which the opening/closing portion is in a range from a closed position to the predetermined rotation angle with respect to the apparatus main body and (ii) the opening/closing portion is stopped in a state in which the opening/closing portion is opened more than the predetermined rotation angle; and
a holding portion configured to hold the opening/closing portion in a holding state, the holding state being the state of the opening/closing portion at the closed position,
wherein, in a case that the holding state is released, the opening/closing portion rotates from the closed position to the predetermined rotation angle.

13. The image reading apparatus according to claim 12,
wherein the biasing portion includes a first elastic member that applies a force to the opening/closing portion in the opening direction and a second elastic member that applies a force to the opening/closing portion in the opening direction, wherein, in a range up to the predetermined rotation angle from the closed position of the opening/closing portion with respect to the apparatus main body, both the first elastic member and the second elastic member apply forces to the opening/closing portion in the opening direction, and wherein, in a state in which the opening/closing portion is opened more than the predetermined rotation angle with respect to the apparatus main body, the second elastic member does not act, but the first elastic member applies a force to the opening/closing portion in the opening direction.

14. The image reading apparatus according to claim 12, wherein the biasing portion includes an adjustment portion configured to adjust the predetermined rotation angle by changing the position of the second elastic member in an expanding/contracting direction.

15. The image reading apparatus according to claim 12, wherein the biasing portion includes an elastic member configured to apply a force to the opening/closing portion in the opening direction, a housing configured to house the elastic member, and a cam member including first and second cam faces brought into contact with the housing, wherein, in a state in which the opening/closing portion is placed in a range up to the predetermined rotation angle from the closed position with respect to the apparatus main body, the housing abuts the first cam face of the cam member such that the elastic member generates a moment about the hinge shaft higher than the moment of the self-weight of the opening/closing portion about the hinge shaft, and wherein, in a state in which the opening/closing portion is opened more than the predetermined rotation angle with respect to the apparatus main body, the housing abuts the second cam face of the cam member such that the elastic member generates a moment about the hinge shaft substantially balanced with the moment of the self-weight of the opening/closing portion about the hinge shaft.

16. The image reading apparatus according to claim 12, wherein the holding portion is includes (i) a magnet disposed on one of the apparatus main body and the opening/closing portion and (ii) a magnetic body disposed on the other, the holding portion maintaining the opening/closing portion at the closed position with respect to the apparatus main body using a magnetic coupling force.

17. The image reading apparatus according to claim 12, wherein the holding portion includes (i) a hook member disposed on one of the apparatus main body and the opening/closing portion and (ii) a hook supporting portion disposed on the other, the holding portion maintaining the opening/closing portion at the closed position with respect to the apparatus main body by causing the hook member and the hook supporting portion to be engaged with each other.

18. The image reading apparatus according to claim 12, further comprising a handle portion used for opening the opening/closing portion, wherein the handle portion is (i) disposed on the side of one of the apparatus main body and the opening/closing portion and configured to be able to release the closure performed by the holding portion.

19. The image reading apparatus according to claims 12, wherein the apparatus main body includes an original placement portion on which an original is placed and an image reading unit that reads the original placed on the original placement portion, and wherein the opening/closing portion is an original feeding device that sends an original to the original placement portion.

20. The image reading apparatus according to claim 12, further comprising:

a first attachment member configured to be fixed to the apparatus main body; and a second attachment member configured to be fixed to the opening/closing portion, wherein the hinge shaft is connected to the first attachment member so as to allow the second attachment member to be rotatable with respect to the first attachment member, and wherein the biasing portion is disposed between the first attachment member and the second attachment member.

21. The image reading apparatus according to claim 12, further comprising a release mechanism configured to release the holding portion from holding the opening/closing portion in the holding state.

22. An image forming apparatus comprising:

an image reading portion configured to read an original; and an image forming portion configured to form an image on a sheet, wherein the image reading portion includes:

an apparatus main body including an original placement portion on which the original is placed and an image reading unit that reads the original placed on the original placement portion;

an opening/closing portion to be rotatable around a hinge shaft so as to open or close the original placement portion;

a biasing portion configured to apply a force to the opening/closing portion in an opening direction such that (i) the opening/closing portion is rotated to a predetermined rotation angle in a state in which the opening/closing portion is in a range from a closed position to the predetermined rotation angle with respect to the apparatus main body and (ii) the opening/closing portion is stopped in a state in which the opening/closing portion is opened more than the predetermined rotation angle; and a holding portion configured to hold the opening/closing portion in a holding state, the holding state being the state of the opening/closing portion at the closed position, wherein, in a case that the holding state is released, the opening/closing portion rotates from the closed position to the predetermined rotation angle.

* * * * *